2,853,415

FUNGICIDAL COMPOSITIONS AND METHODS EMPLOYING 1,2-DIBROMO-1,1,2,2, TETRACHLOROETHANE

Christopher Edward Douglas Smith, Bracknell, and William Allenby Wynne, Widnes, England, assignors to Imperial Chemical Industries Limited, London, England, a corporation of Great Britain No Drawing. Application August 1, 1955
Serial No. 525,788

Claims priority, application Great Britain
August 10, 1954

9 Claims. (Cl. 167—22)

This invention relates to fungicial compositions and in one particular application relates to compositions for the control of fungi causing dry rot in potato tubers by application to the tubers.

A number of fungi present in the soil such as *Trichoderma viride*, *Fusarium gladioli* and *Thielaviopsis basicola* attack flower and vegetable plants. In the case of potatoes a number of diseases which attack the tubers are caused by fungi which are present either in the soil or on the foliage of the plant. Dry rot, for example, which attacks the stored tubers is caused by the fungus *Fusarium caeruleum* which is in the soil and which enters the tuber through wounds in the skin incurred mainly during lifting and sorting. Since main crop potatoes are usually stored in clamps for a more or less protracted period after lifting, fungal infection of this type may cause serious loss. Another soil fungus causing disease in plants, including potatoes, is *Pythium ultimum* which may enter potato tubers by means of wounds. The fungus *Phytophthora infestans* which multiplies in the foliage may by contact with the potato tubers during lifting cause disease in the tubers.

According to the present invention a fungicidal composition comprises 1:2-dibromo-1:1:2:2-tetrachloroethane or a solution thereof in intimate association with a diluent which is a finely divided solid or an aqueous medium or a liquid which forms with said bromochloroethane a "miscible oil" as hereinafter defined.

The invention also includes the use of these compositions for control of fungi.

The compositions may be in the form of dusts comprising an intimate mixture of the active material, 1:2-dibromo-1:1:2:2-tetrachloroethane with a solid powdered diluent such as china clay, talc, fuller's earth, kieselguhr or gypsum. Water dispersible powders may be obtained by incorporating a water-soluble dispersing agent in the above compositions; a wetting agent may also be added to such water dispersible powders. Again the compositions may be in the form of emulsions or dispersions of the active material (or a solution thereof) in water, or they may be miscible oils adapted readily to produce such emulsions or dispersions.

By the term "miscible oils" is meant preparations which are apparently homogeneous and comprise the said bromochloroethane, a solvent and a dispersing agent and which on simply stirring in water are readily emulsified or dispersed. A suitable dispersing agent as a constituent of such oils is an alkylated phenol-ethylene oxide condensate containing a polyethylene glycol chain, which agent is represented by the formula

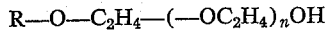

The compositions may be applied in various ways to control pathogenic fungi. Thus they may, for example, be applied to the soil to control the fungi therein. Again they are effective for the treatment of potatoes prior to storage to control fungi such as those responsible for dry rot which enter at the time of lifting the potatoes.

The compositions according to the invention may contain in addition other substances having a specific function, and a further feature of the invention is a combined composition capable of controlling fungi which cause damage to stored potatoes and also capable of suppressing sprouting of the latter. Isopropyl phenylcarbamate, chloroisopropyl phenylcarbamate and tetrachloronitrobenzene are all known to be effective as sprout inhibitors and treatment of potatoes with a dust comprising a mixture of 1:2-dibromo-1:1:2:2-tetrachloroethane, a sprout-inhibiting compound, and an inert diluent is an effective preparation for prolonged storage of the potatoes and ensures that the potatoes when required will be in a good condition.

Dust like compositions for the pre-storage treatment of potato tubers suitably contain up to 15% by weight of the fungicide or higher, but compositions containing more than 15% by weight of the fungicide are less desirable as they do not lend themselves as well to even distribution over the surface of the tubers. In the example given bruised potatoes were treated with 0.27% by weight of a dust-like composition (containing 1% and 5% by weight of 1:2-dibromo-1:1:2:2-tetrachloroethane) but for large scale use 0.05% to 1% by weight of the potato tubers of dust-like compositions would be practicable.

The following examples illustrate but do not limit the invention:

Example I

Compositions containing 1%, 3% and 9% by weight of 1:2-dibromo-1:1:2:2-tetrachloroethane were made up by blending the correct weights of the active substance with china clay until the requisite dust-like texture had been attained.

A number of potato tubers were cut into pieces of about one inch in thickness and inoculated with *Fusarium caeruleum*, a spore suspension of the fungus being mixed with sterilized soil until a mud-like consistency was obtained, and the mixture was spread thinly over the cut surface of the potatoes. 500 grams of inoculated potato pieces were taken for each treatment and three 500 gram portions were placed in half-gallon glass jars, and then each treated with 3 grams of the 1:2-dibromo-1:1:2:2-tetrachloroethane compositions, the dust being blown on to the potatoes while the jar was being rotated, so that as even a distribution as possible was obtained. A fourth portion of 500 grams of untreated inoculated potato pieces was placed in a similar jar as a control. The jars were finally covered with a double thickness of muslin and stored for a fortnight in a moist chamber at a constant temperature of 22° C.

At the end of the storage period, the contents of each jar were examined, the rotted tissue being scraped away and the unrotted potato being weighed. The weights of unrotted potato, after the treatment with 9%, 3% and 1% dusts, were respectively 473, 442, and 110 grams, while the untreated control contained only 38 grams of unrotted tissue. Thus it will be seen that excellent control of the fungus is given by the 9% dust.

For comparison, in the same test, dust containing 3% of a tetrachloronitrobenzene was used, the amount of unrotted tissue obtained being 172 grams.

Example II

The effectiveness of 1:2-dibromo-1:1:2:2-tetrachloroethane against potato storage fungi was further tested as follows:

Whole tubers were severely bruised and brought into contact with a soil containing the fungus *Fusarium caeruleum*. 10 kilogram portions of these inoculated tubers were treated with dusts containing 5% and 1% 1:2-dibromo-1:1:2:2-tetrachloroethane at the rate of 6 lbs. per ton. These potatoes and similar untreated control potatoes were stored in multi-walled paper bags for about 7 weeks. At the end of this time the percentage of tubers that were rotted were 7, 6 and 62 with the 5% dust, the 1% dust and the untreated control respectively.

Many of the potato tubers had sprouted and some of the sprouts had been attacked by the fungus *Corticium solani* which was present on the tubers. The percentage of sprouts attacked was 1, 7, and 74 with the 5% dust, the 1% dust and the untreated control respectively.

What we claim is:

1. A water-dispersible fungicidal powder comprising 1:2-dibromo-1:1:2:2-tetrachloroethane in a fungicidally effective amount in intimate association with a diluent and a water-soluble dispersing agent.

2. A dust-like fungicidal composition as claimed in claim 1 particularly suitable for the control of dry rot in potatoes wherein said diluent is a solid powder selected from the group consisting of china clay, talc, fullers earth, kieselguhr and gypsum.

3. A dust-like fungicidal composition as claimed in claim 2 wherein said bromochloroethane is present in an amount sufficient to exert a fungicidal action but in an amount from about 1% to about 15% by weight of the composition.

4. The composition as claimed in claim 2 having incorporated therein a potato sprout suppressing material selected from the group consisting of isopropyl phenylcarbamate, chloroisopropyl phenylcarbamate and tetrachloronitrobenzene.

5. A fungicidal composition as claimed in claim 1 wherein said bromochloroethane is dispersed in water.

6. A method for the control of fungi causing dry rot in potatoes which comprises providing a water-dispersible fungicidal composition comprising 1:2-dibromo-1:1:2:2-tetrachloroethane fungicidally effective amount in intimate association with a diluent and a water-soluble dispersing agent and applying such composition to the potatoes thereby significantly restricting the formation of dry rot thereon.

7. A method as claimed in claim 6 wherein said fungicidal composition is a dust-like composition and said diluent is a solid powder selected from the group consisting of china clay, talc, fullers earth, kieselguhr and gypsum.

8. A method as claimed in claim 7 wherein said bromochloroethane is present in an amount sufficient to exert a fungicidal action but in an amount from about 1% to about 15% by weight of the composition.

9. A method as claimed in claim 7 wherein said fungicidal composition has incorporated therein a potato sprout suppressing material selected from the group consisting of isopropyl phenylcarbamate, chloroisopropyl phenylcarbamate and tetrachloronitrobenzene.

References Cited in the file of this patent

UNITED STATES PATENTS

| | | |
|---|---|---|
| 2,103,607 | Barber | Dec. 28, 1937 |
| 2,180,744 | Maxcy | Nov. 21, 1939 |
| 2,415,251 | Leavitt | Feb. 4, 1947 |
| 2,651,590 | Karsten | Sept. 8, 1953 |
| 2,661,379 | Calingaert | Dec. 1, 1953 |
| 2,695,859 | Hilmer | Nov. 30, 1954 |

OTHER REFERENCES

Chem. Abst., Decennial Index, 1937–46, p. 5733, and vol. 31, p. 6559.